United States Patent [19]

Veronesi et al.

[11] Patent Number: 5,220,231
[45] Date of Patent: Jun. 15, 1993

[54] INTEGRAL MOTOR PROPULSOR UNIT FOR WATER VEHICLES

[75] Inventors: Luciano Veronesi; James A. Drake, both of O'Hara Township, Allegheny County; Carl W. Bergmark, Harwick, all of Pa.

[73] Assignee: Westinghouse Electric Corp., Pittsburgh, Pa.

[21] Appl. No.: 571,970

[22] Filed: Aug. 23, 1990

[51] Int. Cl.$^5$ .............................................. H02K 5/16
[52] U.S. Cl. ..................................... 310/90; 384/398; 384/97
[58] Field of Search ...................... 310/87, 90; 384/97, 384/398; 440/6, 38, 76, 80, 81

[56] References Cited

U.S. PATENT DOCUMENTS

| | | |
|---|---|---|
| 1,996,195 | 4/1935 | Ferguson . |
| 3,708,251 | 1/1973 | Pierro . |
| 4,360,751 | 11/1982 | Arnold, Jr. et al. . |
| 4,429,924 | 2/1984 | Franz et al. ........................... 310/90 |
| 4,459,087 | 7/1974 | Barge . |
| 4,496,862 | 1/1985 | Weber .................... 310/86 |
| 4,575,315 | 3/1986 | Galais et al. ........................... 310/90 |
| 4,710,111 | 12/1987 | Kubo .................... 384/398 |
| 4,831,297 | 5/1989 | Taylor et al. ........................... 310/87 |
| 4,876,492 | 10/1989 | Lester et al. ........................... 310/62 |

OTHER PUBLICATIONS

Brochure of Jastram-Werke GmbH KG entitled "Jastram Forschung—From the Idea to the Marketable Product" dated Aug. 1988.

*Primary Examiner*—David Cain

[57] ABSTRACT

The submersible propulsor unit of the invention comprises a cylindrical shroud having a water inlet and a water outlet, a propeller having a hub rotatably mounted within the shroud on a shaft, and an electric motor for driving the propeller that includes a rotor mounted around the periphery of the propeller, and a stator circumscribing the shroud, and a bearing assembly that includes means for circulating ambient water around the bearing surfaces to both lubricate and cool them. A stationary cover is detachably secured over the bearing assembly on the water inlet end of the shaft to provide easy access to the bearings in the bearing assembly. The vane members that concentrically mount the shaft within the interior of the shroud are all connected on the downstream side of the propeller to reduce the cavitation and resulting noise when the propeller rotates. The magnetization of the rotor is provided by a plurality of permanent magnets for both improved efficiency, and lower noise. A squirrel cage structure formed from damper bars and conductive wedges is integrated over the magnets of the rotor to assist in the starting of the motor, as well as to insulate the magnets from harmonic currents that could act to de-magnetize them.

21 Claims, 7 Drawing Sheets

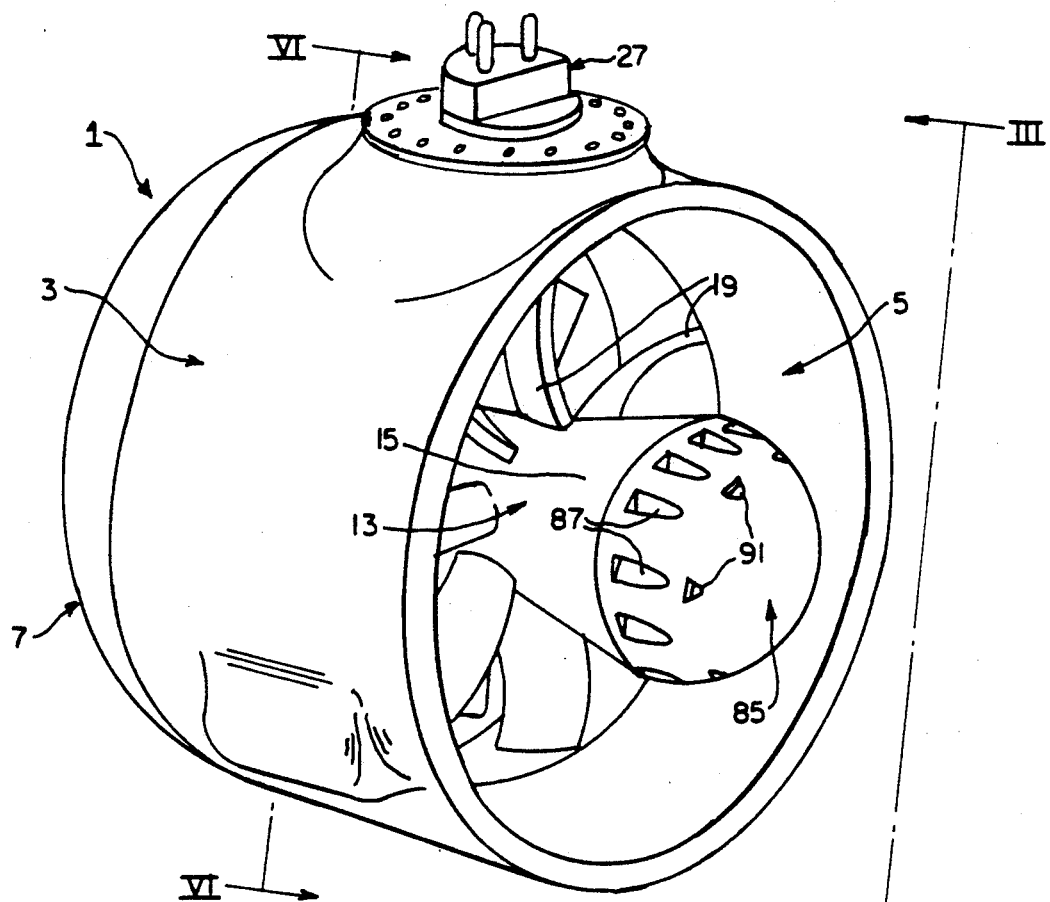
FIG.I.
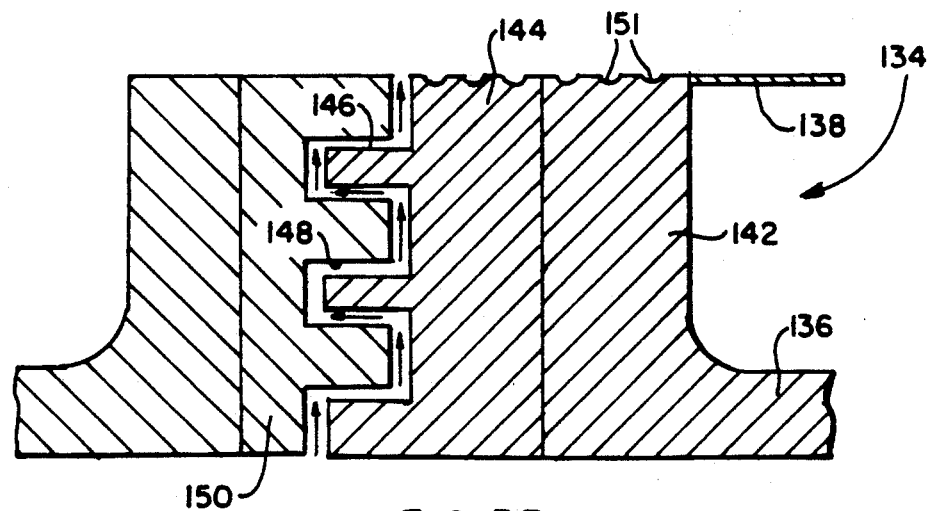
FIG.5B.

INTEGRAL MOTOR PROPULSOR UNIT FOR WATER VEHICLES

BACKGROUND OF THE INVENTION

This invention relates to submersible propulsor units, and is specifically concerned with an improved integral motor propulsor unit for water vehicles that provides high thrust, low weight, low noise, and easy maintenance.

Electric motor type propulsor units for water vehicles are known in the prior art. While such propulsors may be used for surface vessels, they find their primary application as secondary drive units for submarines where reliability, control, and low noise emissions are at a premium. In the prior art, such propulsor units have typically comprised a "canned" or wet winding electric motor having an output shaft that is connected to a propeller. The motor is disposed either directly in front of or behind the propeller. Unfortunately, the fact that the "canned" motor is disposed either directly in front of or behind the flow of water generated by the propeller creates obstructions to fluid flow that tends to reduce the effective thrust that can be generated by these units. To reduce the thrust losses caused by this blockage, higher speed and smaller diameter motors were used. However, the high shaft speed results in high propeller cavitation, which in turn generates a high level of unwanted noise.

To overcome these shortcomings, the Westinghouse Electric Corporation developed an integral motor propulsor unit that is disclosed and claimed in U.S. Pat. No. 4,831,297. This particular propulsor unit resembles a jet engine in structure and generally comprises a cylindrical shroud having a water inlet and a water outlet, a propeller having a hub rotatably mounted within the shroud on a shaft that is concentrically mounted within the shroud by a plurality of support vanes, and an electric motor for driving the propeller that includes an annular rotor mounted around the periphery of the propeller blades, and a stator that is integrated within the shroud of the unit. The advanced design of this particular prior art propulsor unit substantially increases the thrust output for a propulsor for a given weight and size while at the same time reducing the amount of noise generated due to the largely unencumbered flow of water that the propeller of the device can force through the fluid-dynamically shaped shroud. The quietness of the unit is further improved due to the noise-blocking characteristics of the shroud.

While the aforementioned integral motor propulsor unit represents a substantial advance in the art, the applicants have noted a number of areas in the design of this device which could bear improvement. For example, the water lubricated thrust and radial bearings periodically need to be replaced. To do this, the unit must be dry-docked. Additionally, if any of the components of the bearings need to be inspected or replaced, the location of these bearings necessitates an almost complete disassembly of the propulsor unit. The applicants have noted that the support vanes located upstream of the propeller can induce cavitation in the water surrounding the propeller during the operation of the propulsor, which in turn not only creates unwanted noise, but further impairs the efficiency of the unit. The applicants have also observed that the induction-type motor arrangement used in this particular prior art propulsor unit necessitates a very close spacing between the outer diameter of the rotor and the inner diameter of the stator if the electromagnetic coupling between the rotor and the stator is to be effectively implemented. However, such close spacing not only creates drag forces from the thin film of water that is disposed between the stator and the rotor; it also generates additional unwanted noises by increasing the magnitude of the harmonic currents flowing through the rotor (which are always present to some degree due to dissymmetries in the magnetic fields generated by the stator), which in turn cause the rotor to vibrate. The close spacing required between the inner diameter of the stator and the outer diameter of the rotor also creates an unwanted area of vulnerability in the propulsor unit should it be subjected to a high level of mechanical shock, or should sea water debris collect between the stator and rotor.

Clearly, there is a need for an improved, integral motor-type propulsor unit for use in submarines or other water vessels that has a bearing assembly which does not necessitate dry-dock procedures and which is relatively simple and easy to perform an inspection or a maintenance operation on. Ideally, such a propulsor unit would have lower noise characteristics than prior art units, and would incorporate a design which does not necessitate such close spacing between the rotor and stator in order to decrease the vulnerability of the unit in this region to mechanical shock or the collection of sea water debris.

SUMMARY OF THE INVENTION

The invention is an integral motor propulsor unit that obviates or at least ameliorates the aforementioned shortcomings associated with the prior art. The propulsor unit generally comprises a shroud having a water inlet and a water outlet, a propeller having a hub rotatably mounted within the shroud on a shaft, an electric motor for driving the propeller that includes a rotor mounted around the periphery of the propeller and a stator circumscribing the shroud, and a bearing assembly disposed between the hub of the propeller and the shaft that is both lubricated and cooled by the ambient water surrounding the unit. The bearing assembly may include an impeller mechanism to circulate a flow of lubricating and cooling water between the surfaces of the bearings. Moreover, the shaft may include one or more flow inlets located downstream of the propeller for providing a constant stream of lubricating and cooling water to the bearing assembly. These flow inlets may in turn be covered by a filter. The downstream location of these inlets helps to prevent debris entrained in the ambient water from entering the bearing assembly.

The bearing assembly may include both a thrust bearing disposed between the propeller hub and the upstream end of the shaft, and a radial bearing cartridge disposed around the inner circumference of the propeller hub for reducing the friction between these two components of the unit. The unit may further include a cover that is detachably mounted over the thrust bearing for facilitating access to both the thrust bearing and the radial bearing cartridge during a maintenance operation. The removable cover may be connected to the propeller hub and rotate along with the propeller during the operation of the unit, or it may be a separate component that is detachably secured on the inlet end of the shaft that remains stationary with respect to the rotating propeller. The stationary removable cover has the advantage of generating less noise during the operation of the propulsor unit. If desired, struts may be added between the stationary removable cover and the shroud for increasing the shock resistance of the unit.

A plurality of vane members connects the shaft of the unit to the inner surface of the shroud. In order to further reduce the amount of noise generated by the stream of water flowing through the shroud, these vane members are all connected to a portion of the shaft that is disposed between the hub of the propeller and the outlet end of the shroud. In addition to concentrically supporting the shaft within the shroud, the vane members cooperate with the blade of the propeller to increase the thrust generated by the propulsor unit.

Finally, the rotor of the AC motor used to drive the propeller of the unit may utilize permanent magnets instead of induction windings to create the necessary magnetic field within the rotor. The use of such permanent magnets not only increases the overall efficiency of the motor (since impedance losses through induction windings are eliminated), but further advantageously allows the spatial gap between the outer diameter of the rotor and the inner diameter of the stator to be increased without compromising good magnetic coupling between these components. Such an increase in gap size reduces fluid drag on the rotor and further reduces the strength of unwanted harmonic currents generated in the rotor by dissymmetries in the magnetic fields emanated by both the rotor and the stator, which in turn reduces vibrations in the rotor and results in smoother and quieter operation. This increase in gap size further reduces the probability of damage to the unit in this location due to the collection of sea water debris.

The rotor may further include a plurality of conductive damper bars over the outer peripheries of the permanent magnets for providing a squirrel cage structure that assists the rotor in achieving synchronization with the fluctuating magnetic fields emanated by the stator. These damper bars further insulate the magnets from demagnetizing currents such as the previously mentioned harmonic currents, or from currents caused by short-circuits in the unit. A pole cap may be disposed over each of the permanent magnets for housing the conductive damper bars and spacing them away from the magnet. Conductive wedges may be disposed between the permanent magnets in the rotor for increasing the current carrying capacity of the resulting squirrel cage structure. Finally, Stator slots are preferably skewed for additional noise reduction.

The aforementioned structural features results in a propulsor unit that is lower in weight, higher in power, and lower in noise generation that prior art propulsor units.

BRIEF DESCRIPTION OF THE SEVERAL FIGURES

FIG. 1 is a perspective view of the propulsor unit of the invention;

FIG. 5B is an enlargement of the circled area labeled 5B in FIG. 5A, illustrating how the crenulated surfaces of the rotor inlet ring and the stator inlet ring define a tortuous path between the stator and the rotor which helps to keep foreign particle from entering this space;

DETAILED DESCRIPTION OF THE PREFERRED EMBODIMENT

Figure 2:
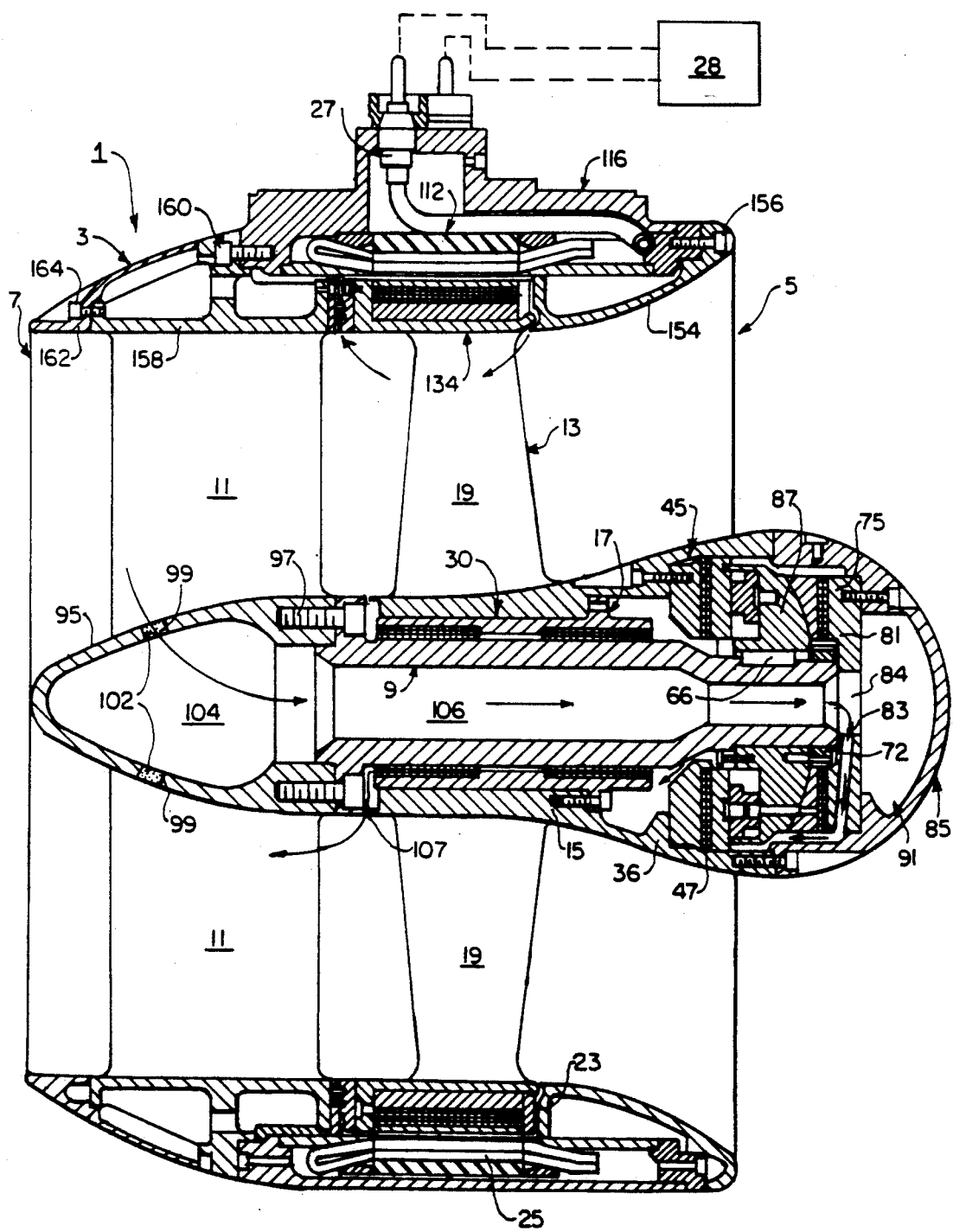
FIG. 2 is a cross-sectional side view of the propulsor unit illustrated in FIG. 1 along the line 2—2.
Figure 4:
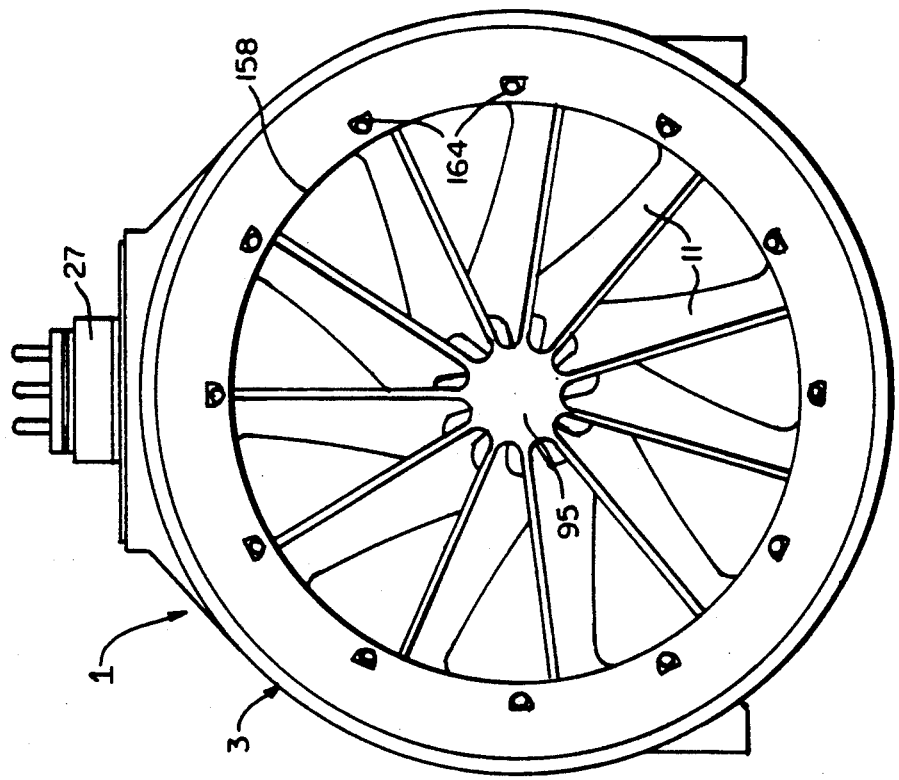
FIGS. 3 and 4 are front and rear views of the propulsor unit illustrated in FIG. 1, respectively.
Figure 3:
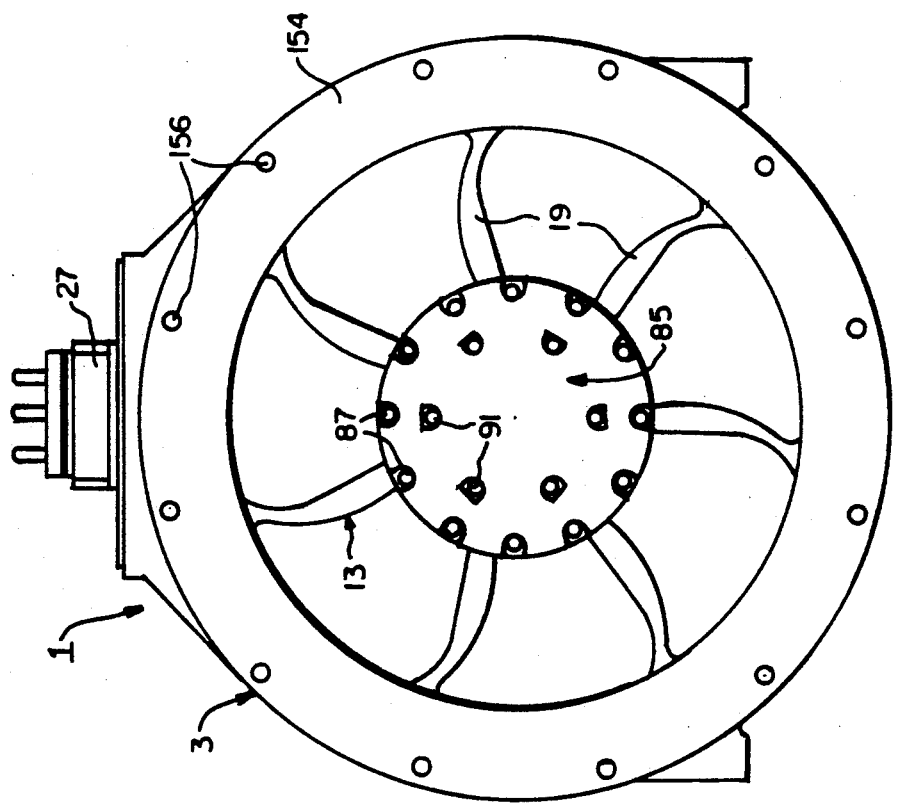

With reference now to FIGS. 1, 2, 3, and 4, wherein like reference numerals designate like components throughout all the several figures, the propulsor unit 1 of the invention generally comprises a shroud assembly 3 having an inlet 5, and an outlet 7 whose interior is generally shaped like a Kort nozzle. A stationary shaft 9 is mounted along the axis of rotation of the interior of the shroud assembly 3 by a plurality of vane members 11. In addition to supporting the shaft 9 within the shroud assembly 3, the vane members 11, by virtue of their canted orientation (best seen with FIG. 4) further function to enhance the thrust generated by the propeller 13. A propeller 13 is disposed within the interior of the shroud assembly 3. The propeller 13 includes a hub 15 at its center which is rotatably mounted onto the stationary shaft 9 by means of a bearing assembly 17. The propeller 13 further includes a plurality of canted blades 19 whose inner ends are equidistantly mounted around the hub 15, and whose outer ends are connected to the rotor 23 of an electric motor 24 that is an integral part of the central portion of the shroud assembly 3. The electric motor 24 further includes a stator 25 disposed around the rotor 23 in a closely-spaced relationship. A stator terminal post assembly 27 is provided at the top end of the propulsor unit 1 for connecting the stator 25 of the unit 1 to a power source 28, which, in the preferred embodiment, is a variable frequency cyclo-converter.

Figure 5A:
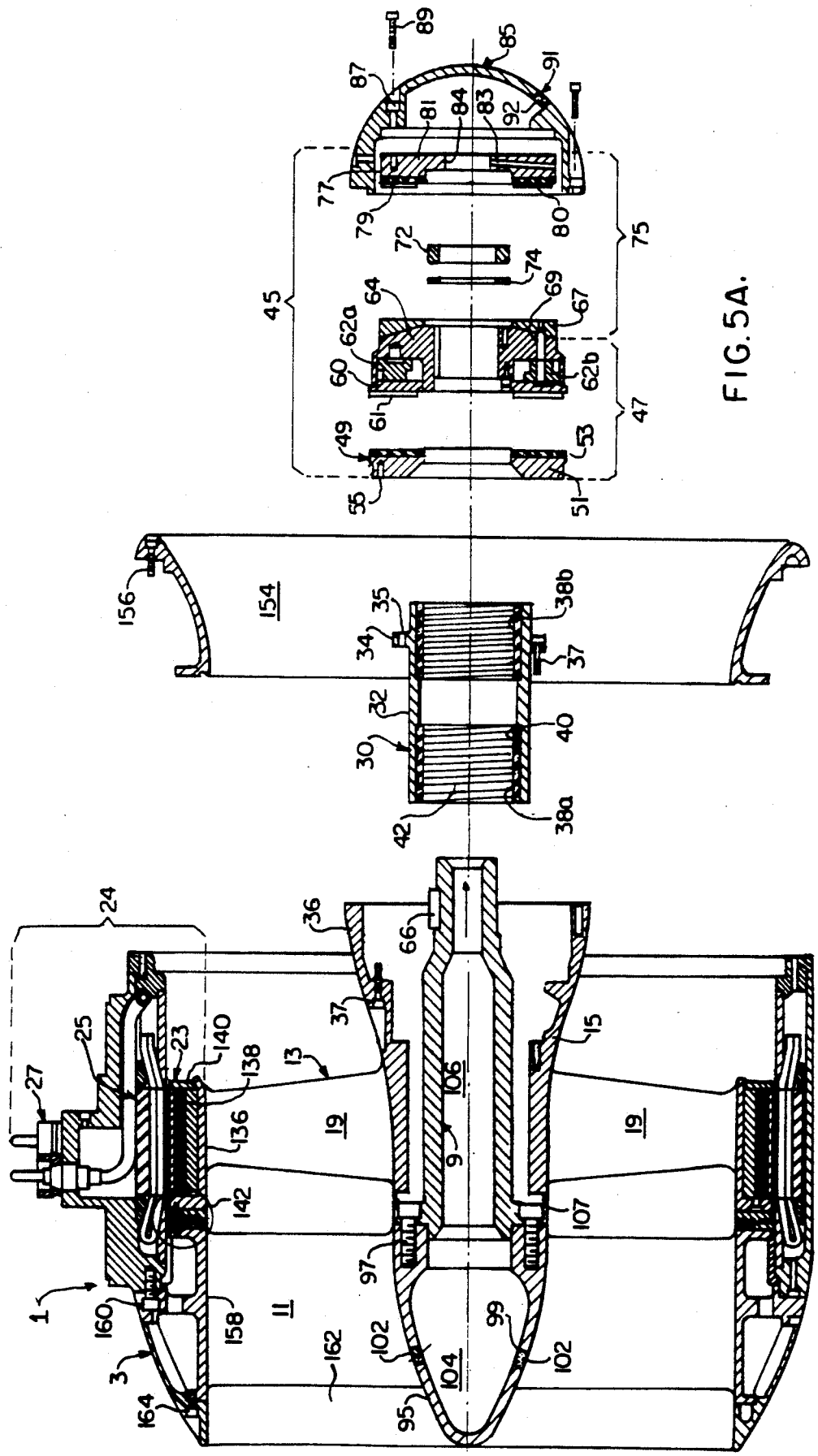
FIG. 5A is an exploded cross-sectional side view of the propulsor unit shown in FIG. 1 illustrating the various components of the bearing assembly disposed between the shaft of the unit, and the hub of the propeller.

With reference now to FIGS. 2 and 5A, the bearing assembly 17 of the propulsor unit 1 is provided with both a radial bearing cartridge 30, and a thrust bearing assembly 45 for minimizing friction between the propeller 13 and the shaft 9 both circumferentially and axially. With specific reference now to FIG. 5A, the radial bearing cartridge 30 includes a tubular bushing 32 preferably formed from Monel ® which is secured around the inner diameter of the hub 15 by means of a pair of bolt lugs 34, each of which includes a threaded bore 35. These threaded bores 35 are registrable with bolts 37 present in the flared, upstream portion 36 of the hub 15. Of course, when these bolts 37 are secured into the position illustrated in FIG. 2, the tubular bushing 32 rotates along with the hub 15 relative to the stationary shaft 9. Further disposed around the inner diameter of the tubular bushing 32 are a pair of rubber bearing sleeves 38a,b. These sleeves are disposed within annular recesses 40 present along the inner surface of the tubular bushing 32 which prevent axial movement between the bearing sleeves 38a,b and the tubular bushing 32. The inner diameter of each of the rubber bearing sleeves 38a,b includes a plurality of spiral grooves 42 which helps the bearing sleeves 38a,b to expel any foreign matter entrained within the sea water which constantly flows between these sleeves 38a,b and the shaft 9.

The thrust bearing 45 includes both a primary thrust bearing 47 which is designed to receive the axial load generated by the propeller 13 during the operation of the unit 1, as well as a secondary thrust bearing 75 designed to bear the substantially lighter load of a "windmilling" propeller 13 when the electric motor 24 is not in operation.

The primary thrust bearing 47 is provided with an annular runner 49 formed from a tilted annular pad 51 which supports an annular rubber ring 53. The tilted annular pad 51 is preferably formed from Monel ®. The tilted annular pad 51 and rubber ring 53 are secured onto the flared, upstream portion 36 of the hub 15 by means of threaded bores 55 present in the pad 51, and bolts 57 mounted in the this portion 36 of the hub 15. The primary thrust bearing 47 further includes a bearing ring 60 which is stationarily mounted onto the non-rotating shaft 9 and which wipingly engages the annular rubber ring 53 of the runner 49 during the operation of the unit 1. A plurality of radially-oriented grooves 61 are provided around the bearing ring 60 for both creating a lubricating film of sea water between the rubber ring 53 of the runner 49, and the ring 60. These grooves 61 serve the further useful purpose of facilitating a constant circulation of sea water between the runner 49 and the ring 60 which helps to reduce wear by dissipating heat generated by friction. The bearing ring 60 is connected to a plurality of link pin supports 62 a,b which in turn are secured onto a support pad 64. The support pad 64 is in turn rigidly mounted onto the stationary shaft 9 by means of a key 66 which prevents the pad 64 from rotating relative to the shaft 9. A bumper plate 67 is mounted on the side of the support pad 64 opposite from the bearing ring 60 by means of a retaining stud 69. The bumper plate 67 has a concave face that engages a convex face on the support pad 64 that allows plate 67 to "wobble" slightly with respect to pad 64 in response to small degrees of off-centering between these two components. As we shall see presently, the bumper plate 67 forms a part of the secondary thrust bearing 75, even though it is mechanically integrated into the structure of the primary trust bearing 47. A lock nut 72, in combination with a lock nut washer 74 serves to axially and rigidly secure the support pad 64 onto the non-rotating shaft 9.

The secondary thrust bearing 75 is generally located upstream of the primary thrust bearing 47 and includes a runner 77 formed from an annular rubber ring 79. Like the previously discussed bearing ring 60, this annular rubber ring 79 includes grooves 80 for creating a thin film of sea water between the ring 79, and an annular support pad 81 which the ring 79 confronts. Preferably, the annular support pad 81 is likewise formed from Monel ®. To facilitate the circulation of sea water throughout the entire bearing assembly 17, the annular support pad 81 further includes a plurality of radially disposed impeller bores 83. The inner ends of the impeller bores 83 communicate with a central opening 84 disposed in the center of the pad 81. During the operation of the unit 1, the pad 81 acts as an impeller which forces a circulation of sea water through the various bearing surfaces within the bearing assembly 17.

At the upstream end of the shaft 9, a rounded, removable cover 85 is provided for preventing raw, unfiltered sea water from flowing through the bearing assembly 17. In this embodiment of the invention, the removable cover is affixed to the annular support pad 81 of the runner 77 of the secondary thrust bearing 75, and hence rotates with respect to the stationary shaft 9 when the motor 24 is in operation. To this end, the removable cover 85 includes a plurality of recessed bores 87 for receiving mounting bolts 89 which screw into threaded bores present around the upstream side of the annular support pad 81. A plurality of vent and flow bores 91 are present around the front of the removable cover 85 to allow enough of a flow of sea water through the cover 85 to prevent any pressure differentials from occurring which might impede the flow of sea water between the bearing surfaces present in the bearing assembly 17. Preferably, each of the vent and flow bores 91 includes a filter 92 for preventing foreign matter entrained in the sea water from entering the interior of the cover 85.

The fact that the entire bearing assembly 17 is secured into place by the removable cover 85, the lock nut and lock nut washer 72,74, the key 66, and mounting bolts 57 and 37 allows easy, frontal access to both the primary and secondary thrust bearing 47,75, as well as the radial bearing cartridge 30. Such easy, frontal access allows maintenance operations such as repair or placement of parts to be performed without the need for removing the entire propulsor unit 1 from the ship upon which it is mounted, or even for the ship to be dry-docked. This is a significant advantage, as the various components of the bearing assembly 17, no matter how well designed, are one of the most likely candidates for repair and replacement during the lifetime of the propulsor unit 1.

At the downstream end of the shaft 9, a vane hub 95 is provide which is connected to the inner ends of each of the previously-discussed vanes 11. Mounting bolts 97 secure the vane hub 95 to the downstream end of the stationary shaft 9. The vane hub 95 includes a plurality of flow ports 99 which are likewise covered by a filter material 102 to prevent foreign matter entrained in the surrounding sea water from entering the hollow interior 104 of the vane hub 95. As is evident in both FIGS. 2 and 5A, the hollow interior 104 of the vane hub 95 communicates with a centrally disposed bore 106 present in the stationary shaft 9.

The manner in which sea water circulates throughout the bearing assembly 17 may best appreciated with respect to FIG. 2. As is indicated by the flow arrows, ambient sea water flows through the downstream flow ports 99 and through the filter material 102, and from thence through the hollow interior 104 of the vane hub 95 and through the centrally disposed bore 106 in the shaft 9. From there, this water flows through the central opening 84 of the pad 81, and through the plurality of impeller bores 83. The centrifugal force imparted to the sea water that flows through the impeller bores 83 creates a pressurized flow of water which exits the outer ends of the bores 83, and flows back along the outer periphery of the support pad 64 of the primary thrust bearing 47, and from thence between the grooves of the bearing ring 60 and on through the central opening present in the runner 49 of the primary thrust bearing 47. From there, this sea water flows in between the rubber bearing sleeves 38a,b and the outer surface of the stationary shaft 9, whereupon it is discharged out through a radial opening 107. While some flow of sea water can occur through the previously-mentioned vent and flow bores 91 present in the removable cover 85, these bores 91 are dimensioned so as to be much smaller in cross-sectional area than the flow ports 99 present in the vane hub 95. Such dimensioning advantageously causes most of the water used to both lubricate and cool the various bearing surfaces of the bearing assembly 17 to be pulled into the unit 1 from the downstream end, which, along with the presence of the filter material 102 in the flow ports 99, helps to discourage the entry of foreign matter entrained in the sea water into the centrally disposed bore 106 in the shaft 9.

Figure 7:
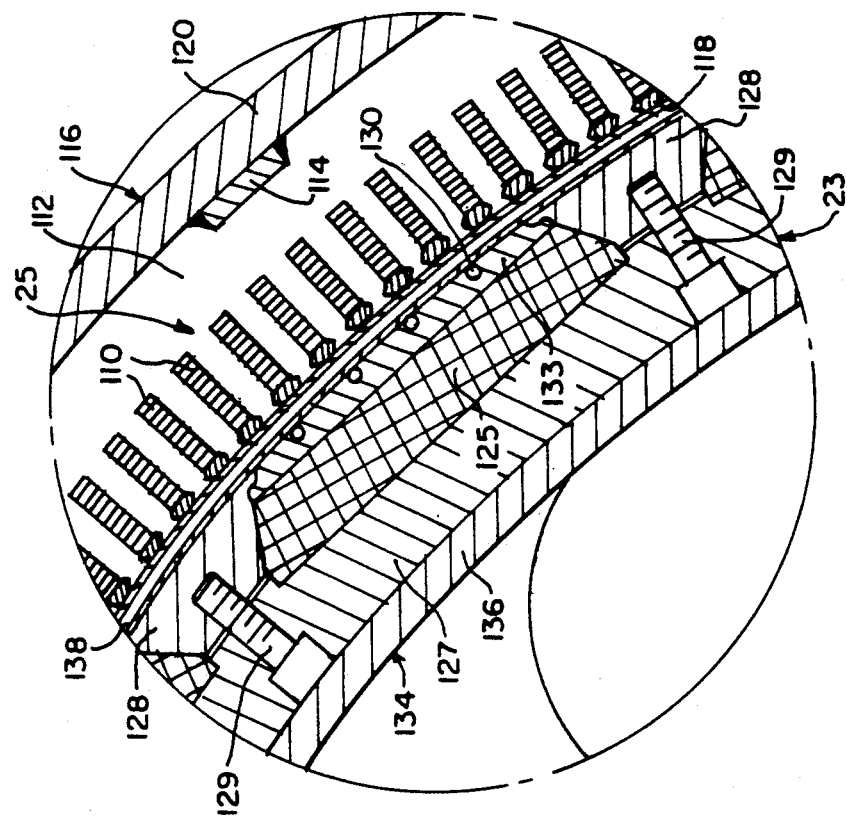
FIG. 7 is an enlargement of the circled area labeled "7" in FIG. 6, illustrating the details of the structure of both the stator and the rotor.
Figure 6:
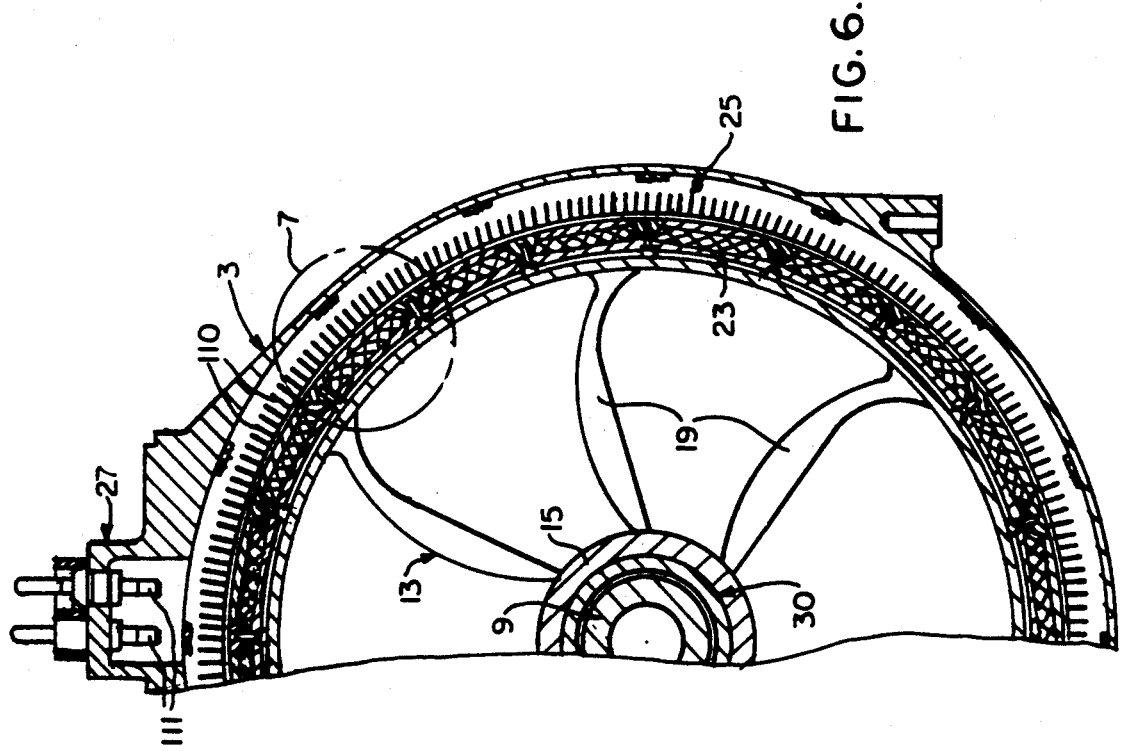
FIG. 6 is a front cross-sectional view of the propulsor unit illustrated in FIG. 1 along the line 6—6.

FIG. 6 and 7 illustrate the details of the electric motor 24 used to power the propeller 13 of the unit 1. As has been indicated earlier, the electric motor 24 is an alternating current motor that generally consists of a rotor 23 mounted around the periphery of the blades 19 of the propeller 13 that is in turn closely surrounded by a stator 25 which is "canned" within the shroud assembly 3. In the preferred embodiment, the ac motor 24 is preferably of the permanent-magnet type. While an induction-type ac motor might also be used, a permanent-magnet type ac motor is preferred for two reasons. First, a permanent-magnet motor provides about 10 percent better efficiency over an induction-type motor. Secondly, this higher efficiency can be realized with a somewhat larger spacial gap between the outer periphery of the rotor 23, and the inner periphery of the stator 25. In an operational propulsor unit 1, this larger gap may be as wide as 0.50 inches (or 1.31 centimeters), in contrast to a standard gap of 0.25 inches or less. The use of a larger (as opposed to a smaller) gap advantageously reduces both the frictional losses between the rotor 23 and stator 25 which are caused by the turbulent film of sea water between these two components and further reduces the amount of noise generated at this particular location of the propulsor unit. Other advantages include the generation of smaller amounts of harmonic currents (caused by unwanted dissymmetries in the magnetic field generated by the stator windings), and consequent lower (as opposed to higher) vibrations caused by the interaction of such currents on the rotor 23. Vibrations caused by any off-center "wobble" of the rotor 23 as it rotates within the stator 25 are also reduced. Finally, the larger gap afforded by the use of permanent magnets in the motor 24 makes it less likely that the rotation of the rotor 23 within the stator 25 could be impeded or stopped by the introduction of foreign matter in this gap, and further renders the entire unit 1 more resistant to external shocks, as the unit 1 would be more tolerant to any shock-induced damage which tended to knock the rotor 23 off-center with respect to the stator 25. All these are significant advantages, particularly in the context of submarine applications.

As may best be seen with respect to FIG. 7, the stator 25 includes a plurality of uniformly spaced stator core windings 110. Each of these stator core windings 110 is ultimately connected to lead wires 111 of the terminal post assembly 27. Moreover, each of 30 the stator core windings 110 is received within a slot present in a stator core 112 (not shown in FIG. 6 or 7, but shown in FIGS. 2 and 5A) formed from laminated magnetic steel rings for conducting the magnetic fields generated by the windings 110. A plurality of building bars 114 are welded around the outer diameter of the 112 for holding together the laminated rings which form the core 112. All of the components of the stator 25 are contained within a water-tight stator housing 116 formed from an inner wall 118, and an outer wall 120.

The rotor 23 of the electric motor 24 is formed from a plurality of trapezoidally-shaped magnets 125 mounted within a magnet housing ring 127 formed from carbon steel. Each of the magnets 125 is preferably formed from an alloy of NbBfe because of the excellent magnetic field capacity and B-H curve characteristic of this material. Each of the magnets 125 is maintained within the magnet housing ring 127 by zirconium-copper rotor wedges 128 secured to the ring 127 by means of bolts 129. In the preferred embodiment, about 20 such trapezoidally-shaped magnets 125 are incorporated within the rotor 23. Four damper bars 130 formed from solid copper rods are provided over the upper ends of each of the magnets 125. These damper bars 130 are disposed within recesses present in pole cap members 133 secured over the top ends of each of the magnets 125. The purpose of the damper bars 130 and the rotor wedges 128 is to protect the magnets 125 from any electrical currents harmonically induced into the top surface of the rotor 23 as a result of unwanted dissymmetries in the magnetic field created by the stator coil windings 110. More specifically, any such harmonic currents will be concentrated within the highly conductive damper bars 130 and rotor wedges 128, which in turn will harmlessly dissipate them. If the damper bar 130 and rotor wedges 128 were not present in the rotor 23, such harmonically-induced currents would flow directly through the bodies of the magnets 125, and ultimately de-magnetize them. Additionally, the combination of the damper bars 130 and the rotor wedges 128 forms a sort of squirrel-cage structure that facilitates the starting of the rotor 23.

With respect now to FIGS. 5A, 5B and 7, the rotor 23, like the stator 25, is "canned" within a water-tight housing 134. The rotor housing 134 includes an inner wall 136, an outer wall 138, a front wall 140, and a rear wall 142 (all of which may be seen in FIG. 5A). With specific reference now to FIG. 5B, a rotor inlet ring 144 is connected to the rear wall 142 of the rotor housing 134, and includes a crenulated rear wall 146 which is complementary in shape to a crenulated front wall 148 of a stator inlet ring 150 disposed in opposition to the rotor inlet ring 144. The complementary crenulations of the rear wall 146 and front wall 148 of the rotor and stator inlet rings 144,150 define a tortuous path for the ambient sea water which helps to prevent foreign particles entrained therein from entering the gap between the outer periphery of the rotor 23, and the inner periphery of the stator 25. Additionally, the outer periphery of the rotor 23 includes a plurality of spiral grooves 151 which help to circulate and flush any such foreign matter out of the gap between the rotor 23 and the stator 25. The flow path created by these spiral grooves 151 is illustrated by the flow arrows present in the upper portion of FIG. 2.

Turning now to the details of the shroud assembly 3 and FIGS. 2 and 5A, this assembly 3 includes a funnel-shaped inlet fairing 154 that is secured by mounting bolts 156 onto the upstream side of the stator housing 116. A vane mounting ring 158 secured onto the downstream side of the stator housing 116 by way of mounting bolts 160. An outlet ring 162 is in turn secured onto the downstream edge of the vane mounting ring 158 by bolts 164. It should be noted that the funnel-shape of the inlet fairing 154 and the frustro-conical shape of the vane mounting ring 158 formed, in combination stator housing 116, a Kort nozzle profile which advantageously maximizes the thrust of the propeller 13 mounted within the interior of the shroud assembly 3.

Figure 8:
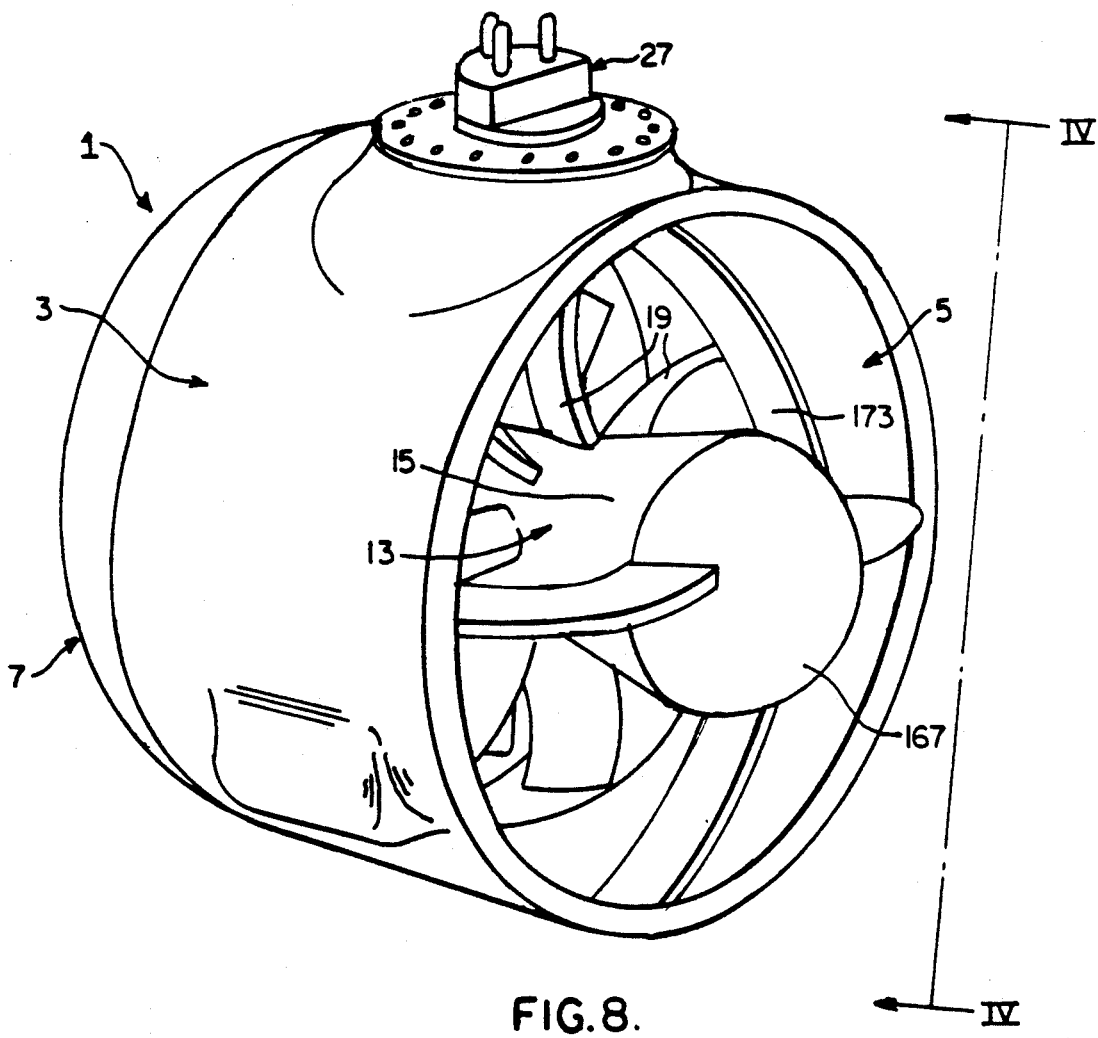
FIG. 8 is a perspective view of an alternate embodiment of the propulsor of the invention which has a stationary removable front cover, instead of a front cover which rotates with the hub of the propeller.
Figure 9:
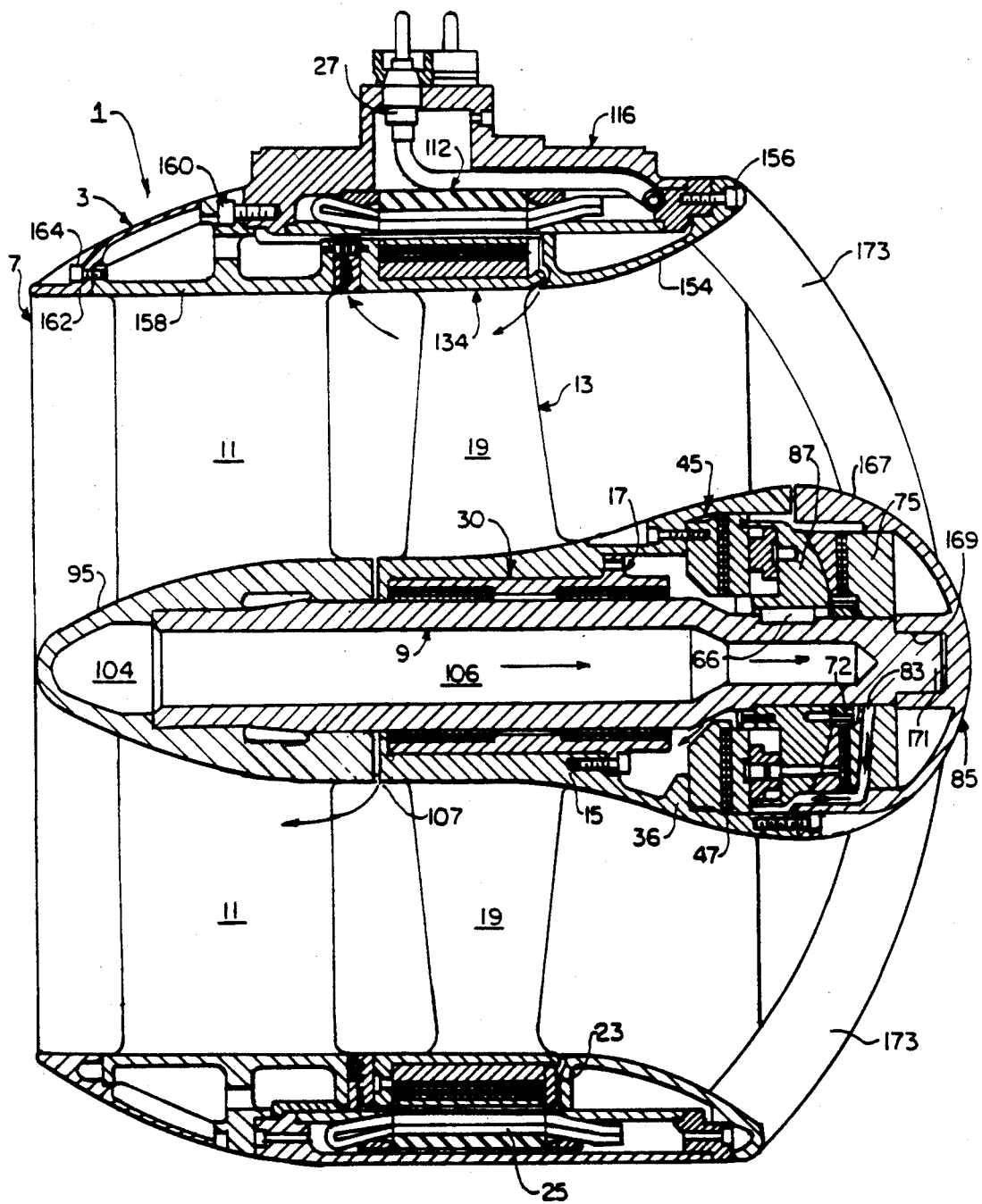
FIG. 9 is a cross-sectional side view of the propulsor unit illustrated in FIG. 8 along the line 9—9.

FIGS. 8 and 9 illustrate an alternate embodiment of the propulsor unit 1 of the invention. In contrast to the previously-discussed embodiment, the removable cover 167 of this alternate embodiment remains stationary with respect to the hub 15 of the propeller 13 in order to minimize the disturbances in the surrounding water that a rotating cover could create, which in turn could lower the efficiency of the propulsor unit 1, as well as generate unwanted noise. The removable cover 167 of this alternate embodiment includes a centrally disposed threaded recess 169 on its interior that may be screwed into a threaded stud 171 stationarily mounted on the upstream end of the non-rotating shaft 9. Additionally, this alternative embodiment may include a plurality of re-inforcing struts 174 connected between the stationary removable cover 167, and the interior of the shroud assembly 3. These struts 173 increase the shock-resistance of the unit 1, which is an important consideration in submarine applications. With the exception of the stationary removable cover 167, the threaded stud 171 on the shaft 9 and the re-enforcing struts 173, the alternate embodiment is in all material respects identical to the previously described first embodiment of the invention.

I claim:

1. A submersible propulsor unit, comprising:
a shroud having a water inlet and a water outlet;
a propeller means having a hub rotatably mounted within said shroud on a shaft;
an electric motor for driving said propeller means including a rotor mounted around the periphery of said propeller means, and a stator mounted within said shroud and spaced away from but magnetically coupled to said rotor, wherein said rotor includes permanent magnets for increasing the minimum distance required between the rotor and stator for efficient magnetic coupling and thereby reducing both drag losses and the noise generated by the propeller means, and
a bearing assembly having bearing surfaces disposed between the hub of said propeller means and said shaft, and including means for circulating ambient water around said bearing surfaces to both lubricate and cool said bearing assembly.

2. A submersible propulsor unit as defined in claim 1 wherein said bearing assembly includes an impeller for circulating ambient water around said bearing surfaces.

3. A submersible propulsor unit as defined in claim 1, further comprising a plurality of vane members connected between said shroud and said shaft for supporting said shaft along the axis of rotation of said shroud, wherein said vane members are connected to a portion of said shaft disposed between said hub and the outlet end of said shroud to reduce the noise generated by the propeller means.

4. A submersible propulsor unit as defined in claim 3, wherein said bearing assembly includes both a thrust bearing and a radial bearing disposed between said shaft and said hub of said propeller means.

5. A submersible propulsor unit as defined in claim 3, wherein said water circulation means includes a water intake port in said shaft substantially aligned with the water outlet of said shroud for discouraging the intake of particle of debris into said port.

6. A submersible propulsor unit as defined in claim 4, wherein said shaft has an end that faces the inlet end of said shroud, and said hub of the propeller means is connected to said thrust bearing which transmits substantially all of the thrust said propeller means generates to said shaft end.

7. A submersible propulsor unit as defined in claim 1, wherein said rotor includes damper bar means for protecting said magnets from spurious currents.

8. A submersible propulsor unit as defined in claim 7, further comprising a removable cover for covering said thrust bearing during operation of the propulsor unit and for facilitating access to said thrust bearing during a maintenance operation.

9. A submersible propulsor unit, comprising:
a cylindrical shroud having a water inlet and a water outlet;
a propeller means having a hub rotatably mounted within said shroud on a shaft;
an electric motor for driving said propeller means including a rotor mounted around the periphery of said propeller means, and a stator mounted within said shroud that is magnetically coupled to the rotor, wherein said rotor includes permanent magnets for increasing the minimum distance required between the stator and the rotor for efficient magnetic coupling and thereby reducing both drag losses and the noise generated by the propeller means; and
a plurality of vane members connected between said shroud and said shaft for supporting said shaft along the axis of rotation of said shroud, wherein said vane members are connected to a portion of said shaft disposed between said hub and the outlet end of said shroud to reduce the noise generated by the propeller means.

10. A submersible propulsor unit, comprising:
a shroud having a water inlet and a water outlet;
a propeller means having a hub rotatably mounted within said shroud on a shaft, wherein said shaft has an end that faces the inlet end of said shroud;
a bearing assembly including a thrust bearing disposed between the hub of said propeller means and the inlet end of said shaft, including impeller means for circulating ambient water around the surfaces of said bearing to lubricate and cool said bearing;
an electric motor for driving the propeller means including a rotor mounted around the periphery of the propeller means, and a stator mounted within said shroud and spaced away from but electromagnetically coupled to the rotor, and
a cover mounted over the inlet end of the shaft over said thrust bearing.

11. A submersible propulsor unit as defined in claim 10, wherein said cover is detachably mounted on said shaft to facilitate access to said thrust bearing.

12. A submersible propulsor unit as defined in claim 10, further comprising a plurality of struts between said stationary cover and said shroud for increasing the shock resistance of the propulsor unit.

13. A submersible propulsor unit as defined in claim 10, wherein said cover is mounted onto said inlet end of said shaft by a single fastener means centrally disposed at the upstream end of the cover to minimize surface irregularities in the contour of the cover.

14. A submersible propulsor unit as defined in claim 10, further comprising a plurality of vane members connected between said shroud and said shaft for supporting said shaft along the axis of rotation of said shroud, wherein said vane members are connected to a portion of said shaft disposed between said hub and the outlet end of said shroud to reduce the noise generated by the propeller means and to increase the thrust of the unit.

15. A submersible propulsor unit as defined in claim 10, wherein said bearing assembly further includes a radial bearing disposed between said shaft and said hub of said propeller means.

16. A submersible propulsor unit as defined in claim 10, wherein said water circulation means includes a water intake port in said shaft substantially aligned with the water outlet of said shroud for discouraging the intake of particle of debris into said port.

17. A submersible propulsor unit as defined in claim 16, further comprising a filter means disposed between said intake port and said ambient water for preventing particles of debris present in said water from entering said intake port.

18. A submersible propulsor unit as defined in claim 15, wherein said radial bearing includes at least one spiral groove for flushing out particles of debris disposed between the relatively moving surfaces of said radial bearing.

19. A submersible propulsor unit, comprising:
a shroud having a water inlet and a water outlet;
a propeller means having a hub rotatably mounted within said shroud on a shaft;
an electric motor for driving said propeller means including a rotor mounted around the periphery of said propeller means, and a stator mounted within said shroud and spaced away from but magnetically coupled to said rotor, and
a bearing assembly having bearing surfaces disposed between the hub of said propeller means and said shaft, and including means for circulating ambient water around said bearing surfaces to both lubricate and cool said bearing assembly, including
a water intake port in said shaft substantially aligned with the water outlet of said shroud for discouraging the intake of particle of debris into said port, and
a plurality of vane members connected between said shroud and said shaft for supporting said shaft along the axis of rotation of said shroud, wherein said vane members are connected to a portion of said shaft disposed between said hub and the outlet end of said shroud to reduce the noise generated by the propeller means.

20. A submersible propulsor unit, comprising:
a shroud having a water inlet and a water outlet;
a propeller means having a hub rotatably mounted with said shroud on a shaft, wherein said shaft has an end that faces the inlet end of said shroud;
a bearing assembly including a thrust bearing disposed between the hub of said propeller means and the inlet end of said shaft;
an electric motor for driving the propeller means including a rotor mounted around the periphery of the propeller means, and a stator mounted within said shroud and spaced away from but electromagnetically coupled to the rotor, and
a cover mounted over the inlet end of the shaft over said thrust bearing that remains stationary with respect to said hub when said propeller means rotates to thereby reduce the noise generated by the rotation of the hub, wherein said cover is detachably mounted on said shaft to facilitate access to said thrust bearing.

21. A submersible propulsor unit, comprising:
a shroud having a water inlet and a water outlet;
a propeller means having a hub rotatably mounted within said shroud on a shaft, wherein said shaft has an end that faces the inlet end of said shroud;
a bearing assembly including a thrust bearing disposed between the hub of said propeller means and the inlet end of said shaft and having means for circulating ambient water around the bearing surfaces of said assembly both to lubricate and cool said bearing assembly including a water intake port in said shaft substantially aligned with the water outlet of said shroud for discouraging the intake of particle of debris into said port;
an electric motor for driving the propeller means including a rotor mounted around the periphery of the propeller means, and a stator mounted within said shroud and spaced away from but electromagnetically coupled to the rotor, and
a cover mounted over the inlet end of the shaft over said thrust bearing that remains stationary with respect to said hub when said propeller means rotates to thereby reduce the noise generated by the rotation of the hub.

* * * * *